(12) United States Patent
Momal et al.

(10) Patent No.: US 8,234,946 B2
(45) Date of Patent: Aug. 7, 2012

(54) HYDRAULIC CONTROL SYSTEM FOR A DUAL CLUTCH TRANSMISSION

(75) Inventors: Pascal Momal, Velizy Villacoublay (FR); Bret M. Olson, Whitelake, MI (US); Philip C. Lundberg, Keego Harbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 360 days.

(21) Appl. No.: 12/707,470

(22) Filed: Feb. 17, 2010

(65) Prior Publication Data

US 2011/0198180 A1    Aug. 18, 2011

(51) Int. Cl.
F16H 3/08 (2006.01)
(52) U.S. Cl. ......................................... 74/330
(58) Field of Classification Search .................. 74/330, 74/333, 340
See application file for complete search history.

(56) References Cited

U.S. PATENT DOCUMENTS

| | | | |
|---|---|---|---|
| 3,834,499 A | 9/1974 | Candellero et al. | |
| 4,653,352 A | 3/1987 | Nakao et al. | |
| 4,944,202 A | 7/1990 | Gierer | |
| 5,441,459 A | 8/1995 | Inukai et al. | |
| 6,698,304 B2 | 3/2004 | Gierling et al. | |
| 6,715,597 B1 | 4/2004 | Buchanan et al. | |
| 6,789,658 B2 | 9/2004 | Busold et al. | |
| 6,827,191 B2 | 12/2004 | Kuhstrebe | |
| 6,883,394 B2 | 4/2005 | Koenig et al. | |
| 6,941,830 B2 | 9/2005 | Ibamoto et al. | |
| 7,300,375 B2 | 11/2007 | Petrzik | |
| 7,401,689 B2 | 7/2008 | Hegerath et al. | |
| 7,464,617 B2 | 12/2008 | Baldascini et al. | |
| 7,464,618 B2 | 12/2008 | Mohlmann et al. | |
| 7,472,616 B2 | 1/2009 | Dreher et al. | |
| 7,478,572 B2 | 1/2009 | Maten et al. | |
| 7,487,866 B2 | 2/2009 | Kruse et al. | |
| 7,591,203 B2 | 9/2009 | Ochi et al. | |
| 2001/0036878 A1 | 11/2001 | Itou et al. | |
| 2002/0060113 A1 | 5/2002 | Harries | |
| 2002/0119864 A1 | 8/2002 | Harries | |
| 2003/0075408 A1 | 4/2003 | Alfredsson | |
| 2003/0226416 A1 | 12/2003 | Umemoto et al. | |
| 2004/0038765 A1 | 2/2004 | Fujimine et al. | |
| 2005/0067251 A1 | 3/2005 | Braford, Jr. et al. | |
| 2005/0107214 A1 | 5/2005 | Koenig | |
| 2007/0175726 A1 | 8/2007 | Combes et al. | |
| 2008/0207392 A1 | 8/2008 | Staudinger et al. | |
| 2008/0210032 A1 | 9/2008 | Uberti et al. | |
| 2008/0223683 A1 | 9/2008 | Grethel | |
| 2009/0000897 A1 | 1/2009 | Staudinger et al. | |
| 2009/0151495 A1 | 6/2009 | Garabello et al. | |
| 2009/0157271 A1 | 6/2009 | Garabello et al. | |
| 2011/0056315 A1* | 3/2011 | Lundberg et al. | 74/473.11 |
| 2011/0168510 A1* | 7/2011 | Lundberg et al. | 192/3.51 |
| 2011/0198178 A1* | 8/2011 | Lundberg et al. | 192/3.57 |
| 2011/0198179 A1* | 8/2011 | Lundberg et al. | 192/3.57 |

FOREIGN PATENT DOCUMENTS

| | | |
|---|---|---|
| DE | 10134115 A1 | 1/2003 |
| EP | 1645786 A2 | 4/2006 |

* cited by examiner

*Primary Examiner* — Ha D. Ho

(57) ABSTRACT

A hydraulic control system for a dual clutch transmission includes a plurality of solenoids and valves in fluid communication with a plurality of clutch actuators and with a plurality of synchronizer actuators. The clutch actuators are operable to actuate a plurality of torque transmitting devices and the synchronizer actuators are operable to actuate a plurality of synchronizer assemblies. Selective activation of combinations of the solenoids allows for a pressurized fluid to flow through the valves to activate at least one of the clutch actuators and synchronizer actuators in order to shift the transmission into a desired gear ratio. A range selection valve is operable to place the transmission in Park and out-of-Park modes of operation.

20 Claims, 7 Drawing Sheets

HYDRAULIC CONTROL SYSTEM FOR A DUAL CLUTCH TRANSMISSION

TECHNICAL FIELD

The invention relates to a control system for a dual clutch transmission, and more particularly to an electro-hydraulic control system having a plurality of solenoids and valves, including an electronic transmission range selection valve, operable to control the dual clutch transmission.

BACKGROUND

A typical multi-speed, dual clutch transmission uses a combination of two friction clutches and several dog clutch/synchronizers to achieve "power-on" or dynamic shifts by alternating between one friction clutch and the other, with the synchronizers being "pre-selected" for the oncoming ratio prior to actually making the dynamic shift. "Power-on" shifting means that torque flow from the engine need not be interrupted prior to making the shift. This concept typically uses countershaft gears with a different, dedicated gear pair or set to achieve each forward speed ratio. Typically an electronically controlled hydraulic control circuit or system is employed to control solenoids and valve assemblies. The solenoid and valve assemblies actuate clutches and synchronizers to achieve the forward and reverse gear ratios.

While previous hydraulic control systems are useful for their intended purpose, the need for new and improved hydraulic control system configurations within transmissions which exhibit improved performance, especially from the standpoints of increased fuel economy and safety, is essentially constant. Accordingly, there is a need for an improved, cost-effective hydraulic control system for use in a dual clutch transmission.

SUMMARY

A hydraulic control system for a dual clutch transmission includes a plurality of solenoids and valves in fluid communication with a plurality of clutch actuators and with a plurality of synchronizer actuators. The clutch actuators are operable to actuate a plurality of torque transmitting devices and the synchronizer actuators are operable to actuate a plurality of synchronizer assemblies. Selective activation of combinations of the solenoids allows for a pressurized fluid to activate at least one of the clutch actuators and synchronizer actuators in order to shift the transmission into a desired gear ratio.

In one aspect of the present invention, the hydraulic control system includes a pump and an accumulator that provide a pressurized hydraulic fluid.

In another aspect of the present invention, the hydraulic control system includes two variable force and two on-off solenoids in communication with a pump and an accumulator.

In yet another aspect of the present invention, the hydraulic control system includes two variable force and two on-off solenoids in communication with the pump and the accumulator, two variable force solenoids or variable flow solenoids in communication with two clutch actuating devices, and four on/off solenoids in communication with four logic valve assemblies.

In yet another aspect of the present invention, the solenoids are in communication with a feed limit valve.

In yet another aspect of the present invention, the hydraulic control system includes a range selection valve for placing the transmission in a Park mode and an out-of-Park mode of operation.

Further objects, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
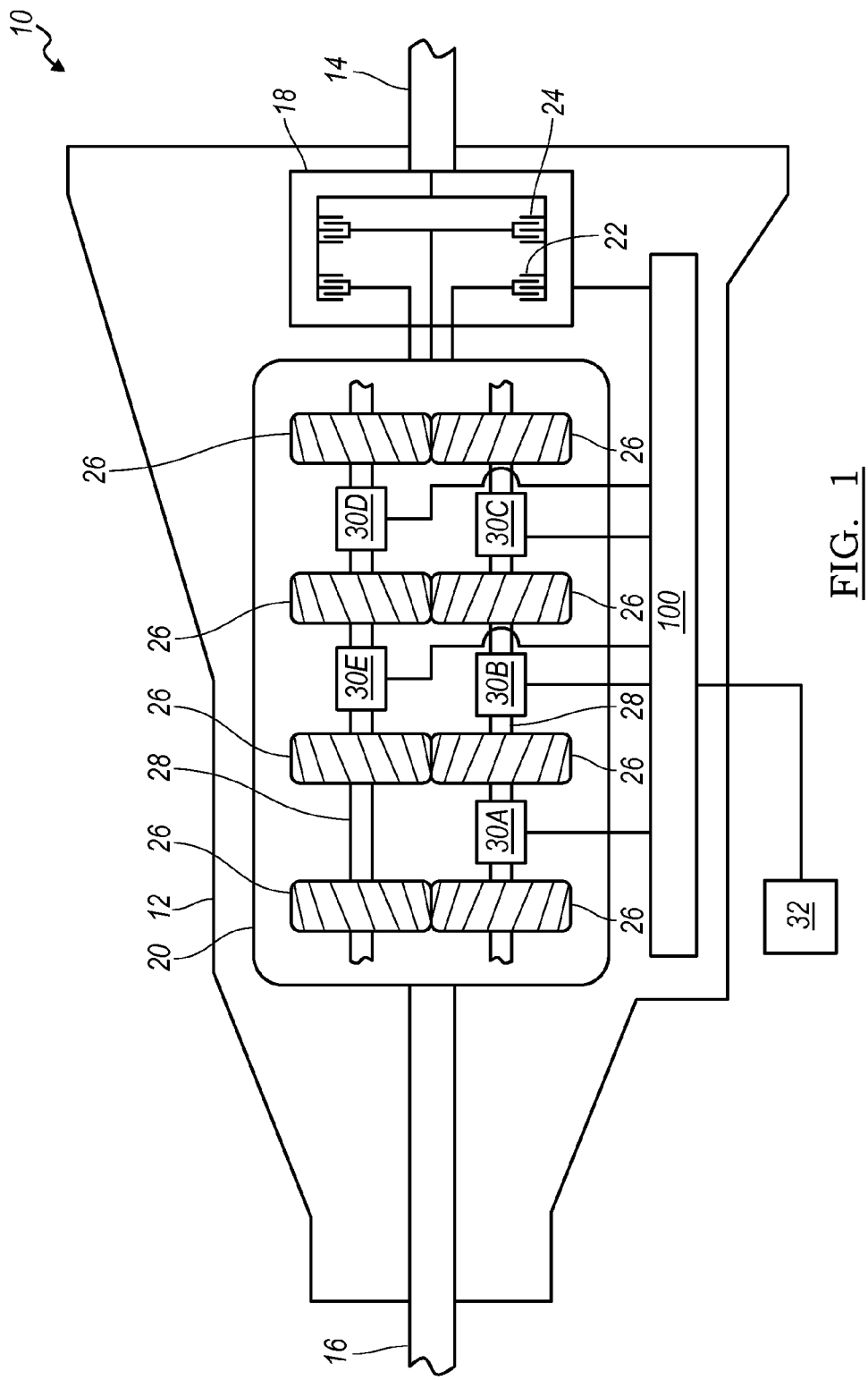
FIG. 1 is a schematic diagram of an exemplary dual clutch automatic transmission incorporating a hydraulic control system according to the principles of the present invention.

With reference to FIG. 1, an exemplary dual clutch automatic transmission incorporating the present invention is illustrated and generally designated by the reference number 10. The dual clutch transmission 10 includes a typically cast, metal housing 12 which encloses and protects the various components of the transmission 10. The housing 12 includes a variety of apertures, passageways, shoulders and flanges which position and support these components. The transmission 10 includes an input shaft 14, an output shaft 16, a dual clutch assembly 18, and a gear arrangement 20. The input shaft 14 is connected with a prime mover (not shown) such as an internal combustion gas or Diesel engine or a hybrid or an electric power plant. The input shaft 14 receives input torque or power from the prime mover. The output shaft 16 is preferably connected with a final drive unit (not shown) which may include, for example, propshafts, differential assemblies, and drive axles. The input shaft 14 is coupled to and drives the dual clutch assembly 18. The dual clutch assembly 18 preferably includes a pair of selectively engageable torque transmitting devices including a first torque transmitting device 22 and a second torque transmitting device 24. The torque transmitting devices 22, 24 are mutually exclusively engaged to provide drive torque to the gear arrangement 20.

The gear arrangement 20 includes a plurality of gear sets, indicated generally by reference number 26, and a plurality of shafts, indicated generally by reference number 28. The plurality of gear sets 26 includes individual intermeshing gears that are connected to or selectively connectable to the plurality of shafts 28. The plurality of shafts 28 may include layshafts, countershafts, sleeve and center shafts, reverse or idle shafts, or combinations thereof. It should be appreciated that the specific arrangement and number of the gear sets 26 and the specific arrangement and number of the shafts 28 within the transmission 10 may vary without departing from the scope of the present invention.

The gear arrangement 20 further includes a first synchronizer assembly 30A, a second synchronizer assembly 30B, a third synchronizer assembly 30C, a fourth synchronizer assembly 30D, and a fifth synchronizer assembly 30E. The synchronizer assemblies 30A-E are operable to selectively couple individual gears within the plurality of gear sets 26 to the plurality of shafts 28. Each synchronizer assembly 30A-E is disposed either adjacent certain single gears or between adjacent pairs of gears within adjacent gear sets 26. Each synchronizer assembly 30A-E, when activated, synchronizes the speed of a gear to that of a shaft and a positive clutch, such as a dog or face clutch. The clutch positively connects or couples the gear to the shaft. The clutch is bidirectionally translated by a shift rail and fork assembly (not shown) within each synchronizer assembly 30A-E.

The transmission also includes a transmission control module 32. The transmission control module 32 is preferably an electronic control device having a preprogrammed digital computer or processor, control logic, memory used to store data, and at least one I/O peripheral. The control logic includes a plurality of logic routines for monitoring, manipulating, and generating data. The transmission control module 32 controls the actuation of the dual clutch assembly 18 and the synchronizer assemblies 30A-E via a hydraulic control system 100 according to the principles of the present invention.

Figure 2A:
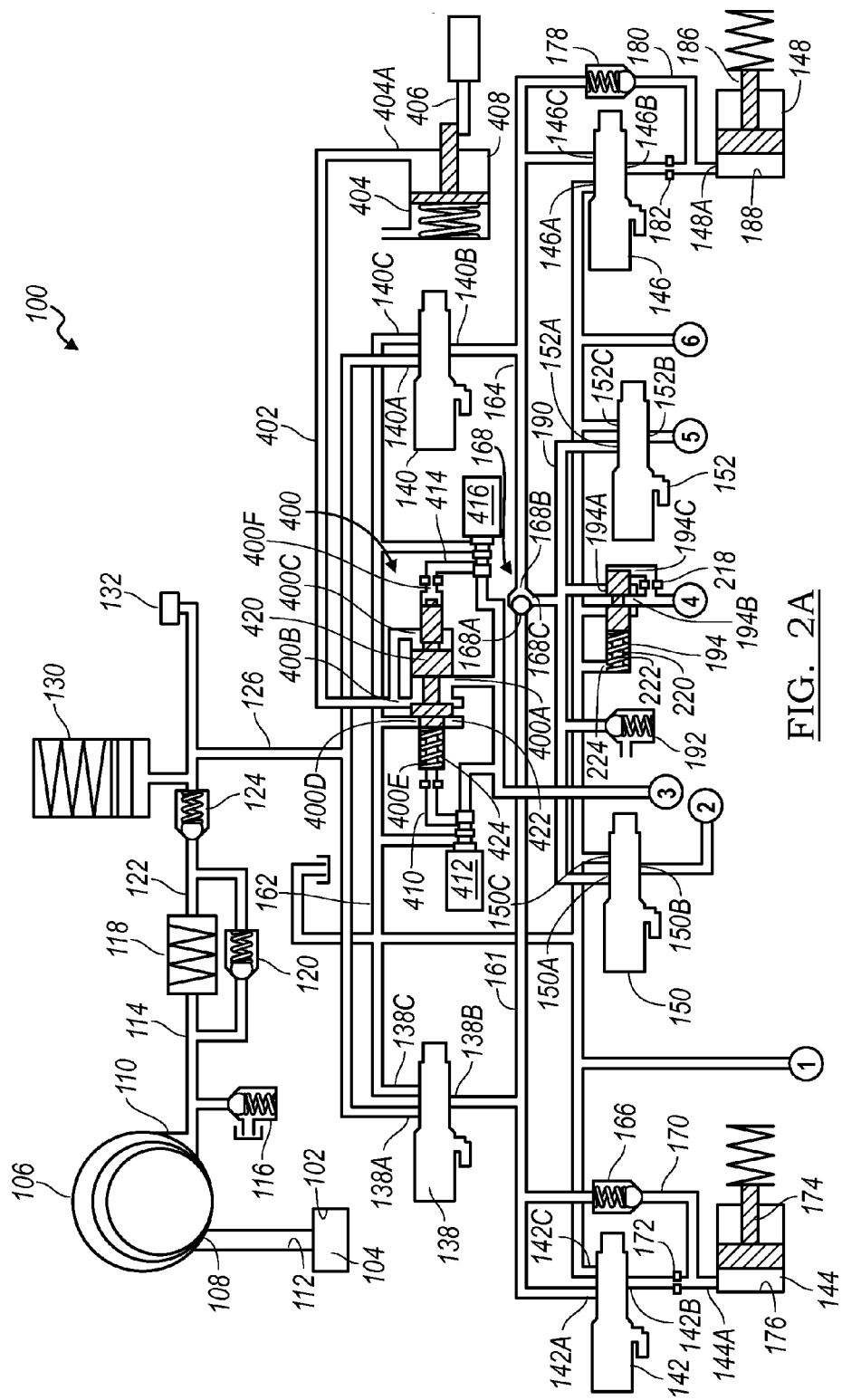
FIGS. 2A-C are a schematic diagram of an embodiment of a hydraulic control system for a dual clutch transmission according to the principles of the present invention.
Figure 2B:
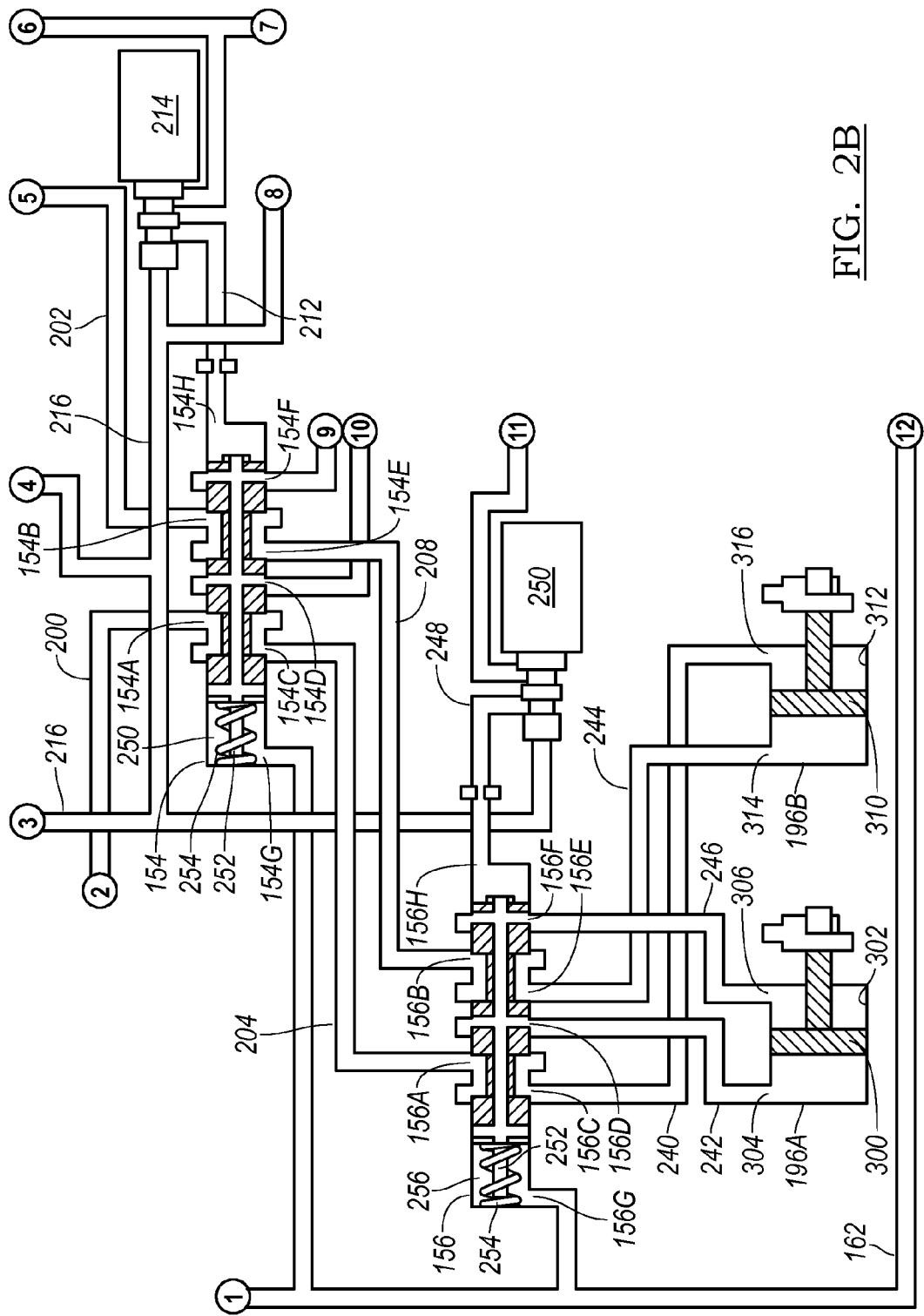
Figure 2C:
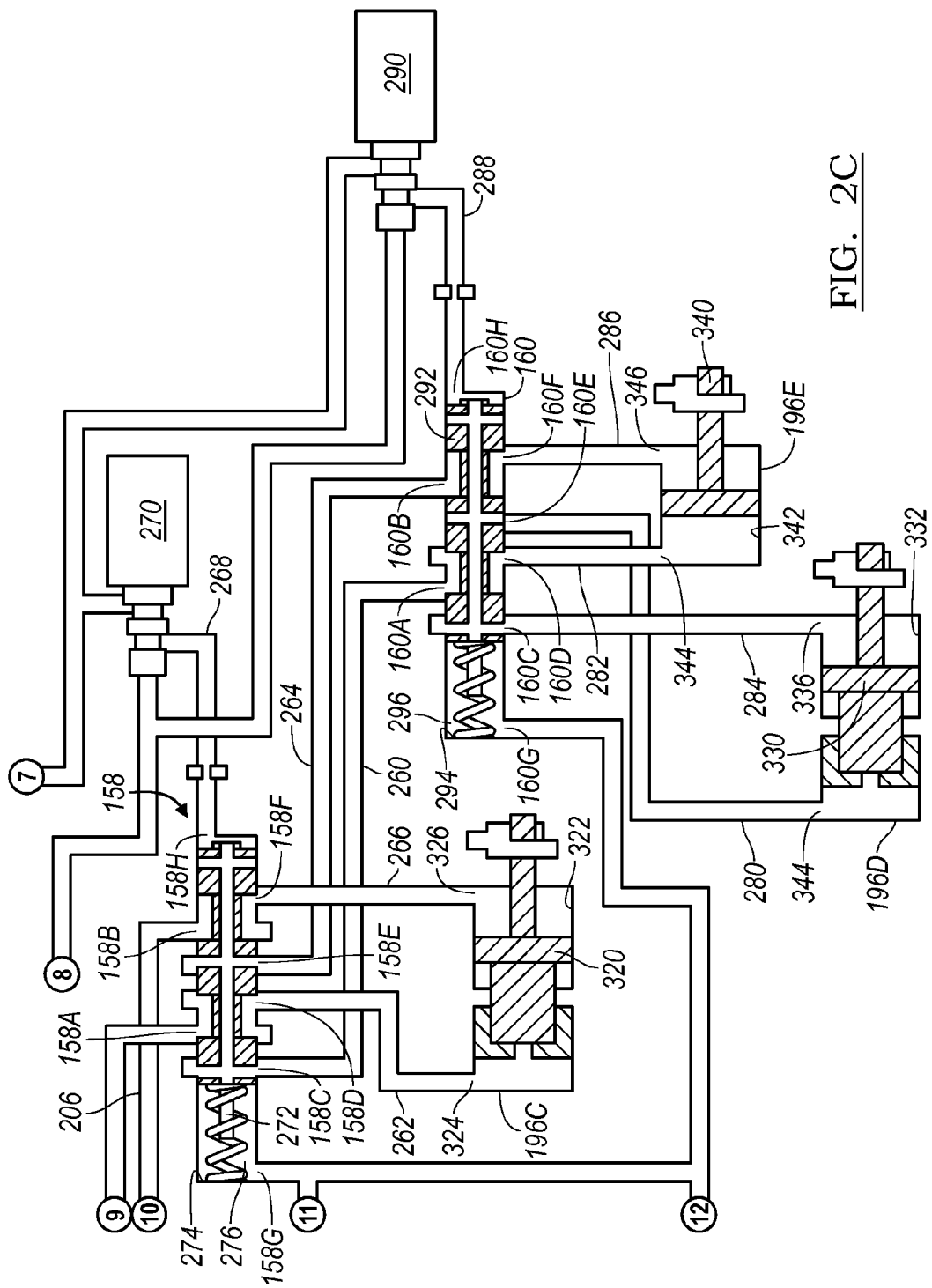

Turning to FIGS. 2A-C, the hydraulic control system 100 of the present invention is operable to selectively engage the dual clutch assembly 18 and the synchronizer assemblies 30A-E by selectively communicating a hydraulic fluid 102 from a sump 104 to a plurality of shift actuating devices, as will be described in greater detail below. The sump 104 is a tank or reservoir preferably disposed at the bottom of the transmission housing 12 to which the hydraulic fluid 104 returns and collects from various components and regions of the automatic transmission 10. The hydraulic fluid 14 is forced from the sump 104 and communicated throughout the hydraulic control system 100 via a pump 106. The pump 106 is preferably driven by an electric motor (not shown) but could be engine driven and may be, for example, a gear pump, a vane pump, a gerotor pump, or any other positive displacement pump. The pump 106 includes an inlet port 108 and an outlet port 110. The inlet port 108 communicates with the sump 104 via a suction line 112. The outlet port 110 communicates pressurized hydraulic fluid 102 to a supply line 114. The supply line 114 is in communication with a spring biased blow-off safety valve 116, a pressure side filter 118, and a spring biased check valve 120. The spring biased blow-off safety valve 116 communicates with the sump 104. The spring biased blow-off safety valve 116 is set at a relatively high predetermined pressure and if the pressure of the hydraulic fluid 102 in the supply line 114 exceeds this pressure, the safety valve 116 opens momentarily to relieve and reduce the pressure of the hydraulic fluid 102. The pressure side filter 118 is disposed in parallel with the spring biased check valve 120. If the pressure side filter 118 becomes blocked or partially blocked, pressure within supply line 114 increases and opens the spring biased check valve 120 in order to allow the hydraulic fluid 102 to bypass the pressure side filter 118.

The pressure side filter 118 and the spring biased check valve 120 each communicate with an outlet line 122. The outlet line 122 is in communication with a second check valve 124. The second check valve 124 is in communication with a main supply line 126 and is configured to maintain hydraulic pressure within the main supply line 126. The main supply line 126 supplies pressurized hydraulic fluid to an accumulator 130 and a main pressure sensor 132. The accumulator 130 is an energy storage device in which the non-compressible hydraulic fluid 102 is held under pressure by an external source. In the example provided, the accumulator 130 is a spring type or gas filled type accumulator having a spring or compressible gas that provides a compressive force on the hydraulic fluid 102 within the accumulator 130. However, it should be appreciated that the accumulator 130 may be of other types without departing from the scope of the present invention. Accordingly, the accumulator 130 is operable to supply pressurized hydraulic fluid 102 back to the main supply line 126. However, upon discharge of the accumulator 130, the second check valve 124 prevents the pressurized hydraulic fluid 102 from returning to the pump 106. The accumulator 130, when charged, effectively replaces the pump 106 as the source of pressurized hydraulic fluid 102, thereby eliminating the need for the pump 106 to run continuously. The main pressure sensor 132 reads the pressure of the hydraulic fluid 102 within the main supply line 126 in real time and provides this data to the transmission control module 32.

The hydraulic control system 100 further includes a plurality of solenoids and valves that direct the pressurized hydraulic fluid 102 delivered from the pump 106 or accumulator 130 via the main supply line 126 to a plurality of actuation devices. For example, the hydraulic control system 100 includes a first pressure control solenoid 138, a second pressure control solenoid 140, a first clutch solenoid 142, a first clutch piston 144, a second clutch solenoid 146, a second clutch piston 148, a first synchronizer pressure control solenoid 150, a second synchronizer pressure control solenoid 152, and first, second, third, and fourth logic valve assemblies 154, 156, 158, and 160.

The first pressure control solenoid 138 and the second pressure control solenoid 140 branches or bifurcates the hydraulic control system 100 into two separate flow paths. This initial bifurcation, before any gear or clutch selection or activation components, essentially splits the control system 100 into two separate control systems. This is advantageous not only from a control standpoint since if only one side of the transmission 10 is active, only the clutch and gears on one shaft can possibly be selected but also its failure mode is desirable since failure of a component on one side of the transmission will affect only that side of the transmission and the control system, clutch and gears on the other side of the transmission will, in all likelihood, still be available to provide limited operation and mobility.

The first pressure control solenoid 138 is preferably an electrically controlled variable force solenoid. The first pressure control solenoid 138 includes an inlet port 138A that communicates with an outlet port 138B when the first pressure control solenoid 138 is activated or energized and includes an exhaust port 138C that communicates with the outlet port 138B when the first pressure control solenoid 138 is inactive or de-energized. Variable activation of the first pressure control solenoid 138 regulates or controls the pressure of the hydraulic fluid 102 as the hydraulic fluid 102 communicates from the inlet port 138A to the outlet port 138B. The inlet port 138A is in communication with the main supply line 126. The outlet port 138B is in communication with a first manifold 161. The exhaust port 138C is in communication with an exhaust line 162 that communicates with the sump 104. In an alternate embodiment, the first pressure control solenoid 138 may be replaced with a feed limit valve and an on/off solenoid.

The second pressure control solenoid 140 is preferably an electrically controlled variable force solenoid. The second pressure control solenoid 140 includes an inlet port 140A that communicates with an outlet port 140B when the second pressure control solenoid 140 is activated or energized and includes an exhaust port 140C that communicates with the outlet port 140B when the second pressure control solenoid 140 is inactive or de-energized. Variable activation of the second pressure control solenoid 140 regulates or controls the pressure of the hydraulic fluid 102 as the hydraulic fluid 102 communicates from the inlet port 140A to the outlet port 140B. The inlet port 140A is in communication with the main supply line 126. The outlet port 140B is in communication with a second manifold 164. The exhaust port 140C is in communication with the exhaust line 162. In an alternate embodiment, the second pressure control solenoid 140 may be replaced with a feed limit valve and an on/off solenoid.

The first manifold 161 communicates the hydraulic fluid 102 from the first pressure control solenoid 138 to the first clutch control solenoid 142, to a first pressure limit control valve 166, and to a ball check valve 168. The first clutch control solenoid 142 is preferably an electrically controlled variable flow solenoid, but can be a variable pressure control solenoid, that is operable to actuate the first torque transmitting device 22, as will be described in greater detail below. The first clutch control solenoid 142 includes an inlet port 142A that communicates with an outlet port 142B when the first clutch control solenoid 142 is activated or energized and includes an exhaust port 142C that communicates with the outlet port 142B when the first clutch control solenoid 142 is inactive or de-energized. Variable activation of the first clutch control solenoid 142 regulates or controls the pressure of the hydraulic fluid 102 as the hydraulic fluid 102 communicates from the inlet port 142A to the outlet port 142B. The inlet port 142A is in communication with the first manifold 161. The outlet port 142B is in communication with a first clutch supply line 170. The exhaust port 142C is in communication with the exhaust line 162. The first pressure limit control valve 166 is disposed in parallel with the first clutch control solenoid 142 and is in communication with the first clutch supply line 170. If pressure within the first clutch supply line 170 exceeds a predetermined value, the first pressure limit control valve 166 opens to relieve and reduce the pressure.

The first clutch supply line 170 communicates through a flow restriction orifice 172 with an inlet port 144A in the first clutch piston assembly 144. It should be appreciated that the flow restricting orifices can be added to and omitted from any hydraulic passage of the hydraulic control system 100 without departing from the scope of the invention. Exact orifice locations, sizes and quantities is preferably developed through the development process. The first clutch piston assembly 144 includes a single acting piston 174 slidably disposed in a cylinder 176. The piston 174 translates under hydraulic pressure to engage the first torque transmitting device 22, shown in FIG. 1. When the first clutch control solenoid 142 is activated or energized, pressurized hydraulic fluid 102 is provided to the first clutch supply line 170. The pressurized hydraulic fluid 102 is communicated from the first clutch supply line 170 to the first clutch piston assembly 144 where the pressurized hydraulic fluid 102 translates the piston 174, thereby engaging the first torque transmitting device 22. The position of the piston 174 is communicated to the transmission controller 32 via a clutch position sensor (not shown). When the first clutch control solenoid 142 is de-energized, the inlet port 142A is closed and hydraulic fluid from the cylinder 176 passes from the outlet port 142B to the exhaust port 142C and into the sump 104, thereby disengaging the first torque transmitting device 22.

The second manifold 164 communicates the hydraulic fluid 102 from the second pressure control solenoid 140 to the second clutch control solenoid 146, to a second pressure limit control valve 178, and to the ball check valve 168. The second clutch control solenoid 146 is preferably an electrically controlled variable flow solenoid, but can be a variable pressure control solenoid, that is operable to actuate the second torque transmitting device 24, as will be described in greater detail below. The second clutch control solenoid 146 includes an inlet port 146A that communicates with an outlet port 146B when the second clutch control solenoid 146 is activated or energized and includes an exhaust port 146C that communicates with the outlet port 146B when the second clutch control solenoid 146 is inactive or de-energized. Variable activation of the second clutch control solenoid 146 regulates or controls the pressure or volume of the hydraulic fluid 102 as the hydraulic fluid 102 communicates from the inlet port 146A to the outlet port 146B. The inlet port 146A is in communication with the second manifold 164. The outlet port 146B is in communication with a second clutch supply line 180. The exhaust port 146C is in communication with the exhaust line 162. The second pressure limit control valve 178 is disposed in parallel with the second clutch control solenoid 146 and is in communication with the second clutch supply line 180. If pressure within the second clutch supply line 180 exceeds a predetermined value set by the upstream variable force control solenoid 140, the second pressure limit control valve 178 opens to relieve and reduce the pressure.

The second clutch supply line 180 communicates through a flow restriction orifice 182 with an inlet port 148A in the second clutch piston assembly 148. The second clutch piston assembly 148 includes a single acting piston 186 slidably disposed in a cylinder 188. The piston 186 translates under hydraulic pressure to engage the second torque transmitting device 24, shown in FIG. 1. When the second clutch control solenoid 146 is activated or energized, pressurized hydraulic fluid 102 is provided to the second clutch supply line 180. The pressurized hydraulic fluid 102 is communicated from the second clutch supply line 180 to the second clutch piston assembly 146 where the pressurized hydraulic fluid 102 translates the piston 186, thereby engaging the second torque transmitting device 24. The position of the piston 186 is communicated to the transmission controller 32 via a clutch position sensor (not shown). When the second clutch control solenoid 146 is de-energized, the inlet port 146A is closed and hydraulic fluid from the cylinder 188 passes from the outlet port 146B to the exhaust port 146C and into the sump 104, thereby disengaging the second torque transmitting device 24.

The ball check valve 168 is disposed between the first manifold 160 and the second manifold 164. The ball check valve 168 includes a first inlet port 168A, a second inlet port 168B, and an outlet port 168C. The first inlet port 168A is in communication with the first manifold 161. The second inlet port 168B is in communication with the second manifold 164. The outlet port 168C is in communication with a third manifold 190. The ball check valve 168 closes off whichever of the inlet ports 168A, 168B that is delivering the lower hydraulic pressure and provides communication between whichever of the inlet ports 168A, 168B having or delivering the higher hydraulic pressure and the outlet port 168C.

The third manifold 190 communicates pressurized hydraulic fluid 102 to a spring biased blow-off safety valve 192, the first synchronizer solenoid 150, the second synchronizer solenoid 152, as well as a feed limit valve assembly 194. The spring biased blow-off safety valve 192 communicates with the sump 104. The spring biased blow-off safety valve 192 is set at a relatively high predetermined pressure and if the pressure of the hydraulic fluid 102 in the third manifold 190 exceeds this pressure, the safety valve 192 opens momentarily to relieve and reduce the pressure of the hydraulic fluid 102.

The first synchronizer control solenoid 150 is preferably an electrically controlled pressure control solenoid, but can be a variable flow solenoid. The first synchronizer control solenoid 150 is operable to control the pressure of hydraulic fluid 102 delivered to one side of each of a plurality of synchronizer actuators 196A-E, as will be described in greater detail below.

The first synchronizer control solenoid 150 includes an inlet port 150A that communicates with an outlet port 150B when the first synchronizer control solenoid 150 is activated or energized and includes an exhaust port 150C that communicates with the outlet port 150B when the first synchronizer control solenoid 150 is inactive or de-energized. Variable activation of the first synchronizer control solenoid 150 regulates or controls the pressure of the hydraulic fluid 102 as the hydraulic fluid 102 communicates from the inlet port 150A to the outlet port 150B. The inlet port 150A is in communication with the third manifold 196. The outlet port 150B is in communication with a fluid line 200. The exhaust port 150C is in communication with the exhaust line 162.

The second synchronizer control solenoid 152 is preferably an electrically controlled pressure control solenoid, but can be a variable flow solenoid. The second pressure control solenoid 152 is operable to control the pressure of hydraulic fluid 102 delivered to another side of each of the synchronizer actuators 196A-E, as will be described in greater detail below. The second synchronizer control solenoid 152 includes an inlet port 152A that communicates with an outlet port 152B when the second synchronizer control solenoid 152 is activated or energized and includes an exhaust port 152C that communicates with the outlet port 152B when the second synchronizer control solenoid 152 is inactive or de-energized. Variable activation of the second synchronizer control solenoid 152 regulates or controls the pressure of the hydraulic fluid 102 as the hydraulic fluid 102 communicates from the inlet port 152A to the outlet port 152B. The inlet port 152A is in communication with the third manifold 190. The outlet port 152B is in communication with a fluid line 202. The exhaust port 192C is in communication with the exhaust line 162.

The first logic valve assembly 154 is in communication with both the first and second synchronizer control solenoids 150, 152 via the fluid lines 200 and 202. The first logic valve assembly 154 is operable to direct pressurized hydraulic fluid 102 from the first and second synchronizers control solenoids 150, 152 to the second and third logic valve assemblies 156, 158 as will be described in greater detail below. The first logic valve assembly 154 includes a first inlet port 154A, a second inlet port 154B, a first outlet port 154C, a second outlet port 154D, a third outlet port 154E, a fourth outlet port 154F, exhaust port 154G, and an actuation port 154H. The first inlet port 154A is in communication with fluid line 200. The second inlet port 154B is in communication with fluid line 202. The first outlet port 154C is in communication with a fluid line 204. The second outlet port 154D is in communication with a fluid line 206. The third outlet port 154E is in communication with a fluid line 208. The fourth outlet port 154F is in communication with a fluid line 210. The exhaust port 154G is in communication with the exhaust line 162. The actuation port 154H is in communication with a fluid line 212 which in turn communicates with a first solenoid 214.

The first solenoid 214 is preferably an electrically controlled on/off solenoid. The first solenoid 214 is operable to control the flow of hydraulic fluid 102 delivered from a solenoid supply line 216 to the fluid line 212. The solenoid supply line 216 in turn communicates with the feed limit valve assembly 194.

The feed limit valve assembly 194 is a passive pressure regulator that regulates the pressure of the hydraulic fluid 102 from the third manifold 190. The feed limit valve assembly 194 includes an inlet port 194A which is supplied with pressurized hydraulic fluid 102 from the third manifold 190 and an outlet port 194B in communication with the solenoid supply line 216. The feed limit valve assembly 194. The outlet port 194B is also in fluid communication with a control port 194C through a flow restricting orifice 218. The feed limit valve assembly 194 includes a valve 220 slidably disposed in a bore 222. At the opposite end of the feed limit valve assembly 194 from the control port 194C and disposed in biasing relationship with the valve 220 is a biasing member 224. The biasing member 224 biases the valve 220 to a de-stroked position that allows communication and fluid flow between the inlet port 194A and the outlet port 194B. As hydraulic pressure builds in the outlet port 194B, in the solenoid supply line 216, and in the control port 194C, the valve 220 will be driven to against the biasing member 224 to a stroked position, which at least partially closes off fluid flow between the inlet port 194A and the outlet port 194B, thereby reducing the pressure in the solenoid supply line 216. As the pressure drops, the valve 220 de-strokes via the biasing member 224 and the pressure within the solenoid supply line 216 can increase.

The first logic valve assembly 154 further includes a valve 230 slidably disposed within a bore 232. In the example provided, the valve 230 includes internal exhaust lines that communicate with the exhaust port 154G. However, it should be appreciated that the valve 230 may be a standard spool valve and the first logic valve assembly 154 may include multiple exhaust ports without departing from the scope of the present invention. The valve 230 is moveable between at least two positions by the first solenoid 214. A biasing member 234 acts on an end of the valve 230 to bias the valve 230 to a de-stroked position. When the first solenoid 214 is energized, hydraulic fluid 102 communicated from the solenoid supply line 216 to the first solenoid 214, passes through the first solenoid 214 to the actuation port 154H and the hydraulic fluid 102 acts on an end of the valve 230 to move the valve 230 to a stroked position against the bias of the basing member 234. When the first solenoid 214 is de-energized, the biasing member 234 moves the valve 230 to the de-stroked position. When the valve 230 is in the de-stroked position, the first inlet port 154A is in communication with the second outlet port 154D, the second inlet port 154B is in communication with the fourth outlet port 154F, and the first and third outlet ports 154C, 154E are in communication with the exhaust port 154G. Accordingly, when the first solenoid 214 is de-energized and the valve 230 is in the de-stroked position, pressurized hydraulic fluid 102 from the first and second pressure control synchronizer solenoids 150, 152 is communicated to the third logic valve assembly 158. When the valve 230 is in the stroked position, the first inlet port 154A is in communication with the first outlet port 154C, the second inlet port 154B is in communication with the third outlet port 154E, and the second and fourth outlet ports 154D, 154F are in communication with the exhaust port 154G. Therefore, when the first solenoid 214 is energized and the valve 230 is in the stroked position, pressurized hydraulic fluid 102 from the first and second synchronizer pressure control solenoids 150, 152 is communicated to the second logic valve assembly 156.

The second logic valve assembly 156 is operable to direct pressurized hydraulic fluid 102 from the first logic valve assembly 154 to the first synchronizer actuator 196A and to the second synchronizer actuator 196B, as will be described in greater detail below. The second logic valve assembly 156 includes a first inlet port 156A, a second inlet port 156B, a first outlet port 156C, a second outlet port 156D, a third outlet port 156E, a fourth outlet port 156F, an exhaust port 156G, and an actuation port 156H. The first inlet port 156A is in communication with fluid line 204. The second inlet port 156B is in communication with fluid line 208. The first outlet port 156C is in communication with a fluid line 240. The second outlet port 156D is in communication with a fluid line 242. The third outlet port 156E is in communication with a fluid line 244. The fourth outlet port 156F is in communication with a fluid line 246. The exhaust port 156G is in communication with the exhaust line 162. The actuation port 156H is in communication with a fluid line 248 which in turn communicates with a second solenoid 250.

The second solenoid 250 is preferably an electrically controlled on/off solenoid. The second solenoid 250 is operable to control the flow of hydraulic fluid 102 delivered from the solenoid supply line 216 to the fluid line 248.

The second logic valve assembly 156 further includes a valve 252 slidably disposed within a bore 254. In the example provided, the valve 252 includes internal exhaust lines that communicate with the exhaust port 156G. However, it should be appreciated that the valve 252 may be a standard spool valve and the second logic valve assembly 156 may include multiple exhaust ports without departing from the scope of the present invention. The valve 252 is moveable between at least two positions by the second solenoid 250. A biasing member 256 acts on an end of the valve 252 to bias the valve 252 to a de-stroked position. When the second solenoid 250 is energized, hydraulic fluid 102 communicated from the solenoid supply line 216 to the second solenoid 250 passes through the second solenoid 250 to the actuation port 156H and the hydraulic fluid 102 acts on an end of the valve 252 to move the valve 252 to a stroked position against the bias of the basing member 256. When the second solenoid 250 is de-energized, the biasing member 256 moves the valve 252 to the de-stroked position. When the valve 252 is in the de-stroked position, the first inlet port 156A is in communication with the second outlet port 156D, the second inlet port 156B is in communication with the fourth outlet port 156F, and the first and third outlet ports 156C, 156E are in communication with the exhaust port 156G. Accordingly, when the second solenoid 250 is de-energized and the valve 252 is in the de-stroked position, pressurized hydraulic fluid 102 from the first and second pressure synchronizer control solenoids 150, 152 is communicated to first synchronizer actuator 196A via fluid lines 242 and 246. When the valve 252 is in the stroked position, the first inlet port 156A is in communication with the first outlet port 156C, the second inlet port 156B is in communication with the third outlet port 156E, and the second and fourth outlet ports 156D, 156F are in communication with the exhaust port 156G. Therefore, when the second solenoid 250 is energized and the valve 252 is in the stroked position, pressurized hydraulic fluid 102 from the first and second synchronizer control solenoids 150, 152 is communicated to the second synchronizer actuator 196B via fluid lines 240 and 244.

The third logic valve assembly 158 is operable to direct pressurized hydraulic fluid 102 from the first logic valve assembly 154 to the third synchronizer actuator 196C and to the fourth logic valve assembly 160, as will be described in greater detail below. The third logic valve assembly 158 includes a first inlet port 158A, a second inlet port 158B, a first outlet port 158C, a second outlet port 158D, a third outlet port 158E, a fourth outlet port 158F, an exhaust port 158G, and an actuation port 158H. The first inlet port 158A is in communication with fluid line 210. The second inlet port 158B is in communication with fluid line 206. The first outlet port 158C is in communication with a fluid line 260. The second outlet port 158D is in communication with a fluid line 262. The third outlet port 158E is in communication with a fluid line 264. The fourth outlet port 158F is in communication with a fluid line 266. The exhaust port 158G is in communication with the exhaust line 162. The actuation port 158H is in communication with a fluid line 268 which in turn communicates with a third solenoid 270.

The third solenoid 270 is preferably an electrically controlled on/off solenoid. The third solenoid 270 is operable to control the flow of hydraulic fluid 102 delivered from the solenoid supply line 216 to the fluid line 268.

The third logic valve assembly 158 further includes a valve 272 slidably disposed within a bore 274. In the example provided, the valve 272 includes internal exhaust lines that communicate with the exhaust port 158G. However, it should be appreciated that the valve 272 may be a standard spool valve and the third logic valve assembly 158 may include multiple exhaust ports without departing from the scope of the present invention. The valve 272 is moveable between at least two positions by the third solenoid 270. A biasing member 276 acts on an end of the valve 272 to bias the valve 272 to a de-stroked position. When the third solenoid 270 is energized, hydraulic fluid 102 communicated from the solenoid supply line 216 to the third solenoid 270 passes through the third solenoid 270 to the actuation port 158H and the hydraulic fluid 102 acts on an end of the valve 272 to move the valve 272 to a stroked position against the bias of the basing member 276. When the third solenoid 270 is de-energized, the biasing member 276 moves the valve 272 to the de-stroked position. When the valve 272 is in the de-stroked position, the first inlet port 158A is in communication with the second outlet port 158D, the second inlet port 158B is in communication with the fourth outlet port 158F, and the first and third outlet ports 158C, 158E are in communication with the exhaust port 158G. Accordingly, when the third solenoid 270 is de-energized and the valve 272 is in the de-stroked position, pressurized hydraulic fluid 102 from the first and second control synchronizer solenoids 150, 152 is communicated to the third synchronizer actuator 196C via fluid lines 262 and 266. When the valve 272 is in the stroked position, the first inlet port 158A is in communication with the first outlet port 158C, the second inlet port 158B is in communication with the third outlet port 158E, and the second and fourth outlet ports 158D, 158F are in communication with the exhaust port 158G. Therefore, when the third solenoid 270 is energized and the valve 272 is in the stroked position, pressurized hydraulic fluid 102 from the first and second synchronizer pressure control solenoids 150, 152 is communicated to the fourth logic vale assembly 160 via fluid lines 260 and 264.

The fourth logic valve assembly 160 is operable to direct pressurized hydraulic fluid 102 from the third logic valve assembly 158 to the fourth synchronizer actuator 196D and to the fifth synchronizer actuator 196E, as will be described in greater detail below. The fourth logic valve assembly 160 includes a first inlet port 160A, a second inlet port 160B, a first outlet port 160C, a second outlet port 160D, a third outlet port 160E, a fourth outlet port 160F, an exhaust port 160G, and an actuation port 160H. The first inlet port 160A is in communication with fluid line 260. The second inlet port 160B is in communication with fluid line 264. The first outlet port 160C is in communication with a fluid line 280. The second outlet port 160D is in communication with a fluid line 282. The third outlet port 160E is in communication with a fluid line 284. The fourth outlet port 160F is in communication with a fluid line 286. The exhaust port 160G is in communication with the exhaust line 162. The actuation port 160H is in communication with a fluid line 288 which in turn communicates with a fourth solenoid 290.

The fourth solenoid 290 is preferably an electrically controlled on/off solenoid. The fourth solenoid 290 is operable to control the flow of hydraulic fluid 102 delivered from the solenoid supply line 216 to the fluid line 288.

The fourth logic valve assembly 160 further includes a valve 292 slidably disposed within a bore 294. In the example provided, the valve 292 includes internal exhaust lines that communicate with the exhaust port 160G. However, it should be appreciated that the valve 292 may be a standard spool valve and the fourth logic valve assembly 160 may include multiple exhaust ports without departing from the scope of the present invention. The valve 292 is moveable between at least two positions by the fourth solenoid 290. A biasing member 296 acts on an end of the valve 292 to bias the valve 292 to a de-stroked position. When the fourth solenoid 290 is energized, hydraulic fluid 102 communicated from the solenoid supply line 216 to the fourth solenoid 290 passes through the fourth solenoid 290 to the actuation port 160H and the hydraulic fluid 102 acts on an end of the valve 292 to move the valve 292 to a stroked position against the bias of the basing member 296. When the fourth solenoid 290 is de-energized, the biasing member 296 moves the valve 292 to the de-stroked position. When the valve 292 is in the de-stroked position, the first inlet port 160A is in communication with the second outlet port 160D, the second inlet port 160B is in communication with the fourth outlet port 160F, and the first and third outlet ports 160C, 160E are in communication with the exhaust port 160G. Accordingly, when the fourth solenoid 290 is de-energized and the valve 292 is in the de-stroked position, pressurized hydraulic fluid 102 from the first and second synchronizer control solenoids 150, 152 is communicated to fifth synchronizer actuator 196E via fluid lines 282 and 286. When the valve 292 is in the stroked position, the first inlet port 160A is in communication with the first outlet port 160C, the second inlet port 160B is in communication with the third outlet port 160E, and the second and fourth outlet ports 160D, 160F are in communication with the exhaust port 160G. Therefore, when the fourth solenoid 290 is energized and the valve 292 is in the stroked position, pressurized hydraulic fluid 102 from the first and second synchronizer control solenoids 150, 152 is communicated to the fourth synchronizer actuator 196D via fluid lines 280 and 284.

The synchronizer actuators 196A-E are preferably two-area piston assemblies operable to each engage or actuate a shift rail in a synchronizer assembly, but can be three-area piston assemblies, or a combination of each. More specifically, the first synchronizer actuator 196A is operable to actuate the first synchronizer assembly 30A, the second synchronizer actuator 196B is operable to actuate the second synchronizer assembly 30B, the third synchronizer actuator 196C is operable to actuate the third synchronizer assembly 30C, the fourth synchronizer actuator 196D is operable to actuate the fourth synchronizer assembly 30D, and the fifth synchronizer actuator 196E is operable to actuate the fifth synchronizer assembly 30E.

The first synchronizer actuator 196A includes a piston 300 slidably disposed within a piston housing or cylinder 302. The piston 300 presents three separate areas for pressurized hydraulic fluid to act upon. The piston 300 engages or contacts a finger lever or other shift rail component (not shown) of the first synchronizer assembly 30A. The first synchronizer actuator 196A includes a fluid port 304 that communicates with one end of the piston 300 and a fluid port 306 that communicates with an opposite end of the piston 300. Fluid port 304 is in communication with fluid line 242 and fluid port 306 is in communication with fluid line 246. Accordingly, the pressurized hydraulic fluid 102 communicated from the second logic valve assembly 156 enters the first synchronizer actuator 196A through the fluid ports 304, 306 and contacts the piston 300. The difference in pressure between the hydraulic fluid delivered to fluid port 304 from the first synchronizer control solenoid 150 and the hydraulic fluid delivered to fluid port 306 from the second synchronizer control solenoid 152 moves the piston 300 between various positions. Each position in turn corresponds to a position of the shift rail of the first synchronizer assembly 30A (i.e., engaged left, engaged right, and neutral).

The second synchronizer actuator 196B includes a piston 310 slidably disposed within a piston housing or cylinder 312. The piston 310 presents two separate areas for pressurized hydraulic fluid to act upon. The piston 310 engages or contacts a finger lever or other shift rail component (not shown) of the second synchronizer assembly 30B. The second synchronizer actuator 196B includes a fluid port 314 that communicates with one end of the piston 310 and a fluid port 316 that communicates with an opposite end of the piston 310. Fluid port 314 is in communication with fluid line 244 and fluid port 316 is in communication with fluid line 240. Accordingly, the pressurized hydraulic fluid 102 communicated from the second logic valve assembly 156 enters the second synchronizer actuator 196B through the fluid ports 314, 316 and contacts the piston 310. The difference in pressure between the hydraulic fluid delivered to fluid port 316 from the first synchronizer control solenoid 150 and the hydraulic fluid delivered to fluid port 314 from the second synchronizer control solenoid 152 moves the piston 310 between various positions. Each position in turn corresponds to a position of the shift rail of the first synchronizer assembly 30B (i.e., engaged left, engaged right, and neutral).

The third synchronizer actuator 196C includes a piston 320 slidably disposed within a piston housing or cylinder 322. The piston 320 presents three separate areas for pressurized hydraulic fluid to act upon. The piston 320 engages or contacts a finger lever or other shift rail component (not shown) of the third synchronizer assembly 30C. The third synchronizer actuator 196C includes a fluid port 324 that communicates with one end of the piston 320 and a fluid port 326 that communicates with an opposite end of the piston 320. Fluid port 324 is in communication with fluid line 262 and fluid port 326 is in communication with fluid line 266. Accordingly, the pressurized hydraulic fluid 102 communicated from the third logic valve assembly 158 enters the third synchronizer actuator 196C through the fluid ports 324, 326 and contacts the piston 320. The difference in pressure between the hydraulic fluid delivered to fluid port 326 from the first synchronizer control solenoid 150 and the hydraulic fluid delivered to fluid port 324 from the second synchronizer control solenoid 152 moves the piston 320 between various positions. Each position in turn corresponds to a position of the shift rail of the third synchronizer assembly 30C (i.e., engaged left, engaged right, and neutral).

The fourth synchronizer actuator 196D includes a piston 330 slidably disposed within a piston housing or cylinder 332. The piston 330 presents three separate areas for pressurized hydraulic fluid to act upon. The piston 330 engages or contacts a finger lever or other shift rail component (not shown) of the fourth synchronizer assembly 30D. The fourth synchronizer actuator 196D includes a fluid port 334 that communicates with one end of the piston 330 and a fluid port 336 that communicates with an opposite end of the piston 330. Fluid port 334 is in communication with fluid line 280 and fluid port 336 is in communication with fluid line 284. Accordingly, the pressurized hydraulic fluid 102 communicated from the fourth logic valve assembly 160 enters the fourth synchronizer actuator 196D through the fluid ports 334, 336 and contacts the piston 330. The difference in pressure between the hydraulic fluid delivered to fluid port 336 from the first synchronizer control solenoid 150 and the hydraulic fluid delivered to fluid port 334 from the second synchronizer control solenoid 152 moves the piston 330 between various positions. Each position in turn corresponds to a position of the shift rail of the fourth synchronizer assembly 30D (i.e., engaged left, engaged right, and neutral).

The fifth synchronizer actuator 196E includes a piston 340 slidably disposed within a piston housing or cylinder 342. The piston 340 presents two separate areas for pressurized hydraulic fluid to act upon. The piston 340 engages or contacts a finger lever or other shift rail component (not shown) of the fifth synchronizer assembly 30E. The fifth synchronizer actuator 196E includes a fluid port 344 that communicates with one end of the piston 340 and a fluid port 346 that communicates with an opposite end of the piston 340. Fluid port 344 is in communication with fluid line 282 and fluid port 346 is in communication with fluid line 286. Accordingly, the pressurized hydraulic fluid 102 communicated from the fifth logic valve assembly 160 enters the fifth synchronizer actuator 196E through the fluid ports 344, 346 and contacts the piston 340. The difference in pressure between the hydraulic fluid delivered to fluid port 346 from the first synchronizer control solenoid 150 and the hydraulic fluid delivered to fluid port 344 from the second synchronizer control solenoid 152 moves the piston 340 between various positions. Each position in turn corresponds to a position of the shift rail of the fifth synchronizer assembly 30E (i.e., engaged left, engaged right, and neutral).

The hydraulic control system 100 further includes an electronic range selection system (ETRS) valve assembly 400 operable to provide at least two modes of transmission operation including a first mode or out-of-Park mode and a second mode or Park mode. While in Park mode, the transmission is prevented from moving the vehicle by preferably locking an output shaft (not shown) of the transmission. While in out-of-Park mode, the transmission may move the vehicle by engaging any of the forward or reverse speed ratios. The ETRS valve assembly 400 generally includes an inlet port 400A in communication with the solenoid supply line 216 and an outlet port 400B in communication with a park servo feed line 402. The park servo feed line 402 is in communication with a feedback port 400C in the ETRS valve assembly 400 and with a park servo 404. The park release servo 404 is operable to translate hydraulic fluid pressure into mechanical movement or translation of a park release actuator (not shown) in order to place the transmission 10 in the out-of-Park mode of operation. The park servo 404 includes a piston 406 slidably disposed within a cylinder or housing 408. The park release servo 404 includes a fluid port 404A that communicates with the park servo feed line 402. The ETRS valve assembly 400 also includes an exhaust port 400D that communicates with the exhaust line 162 and control ports 400E and 400F. Control port 400E is in communication with a fluid line 410 which is in communication with a return-to-Park (RTP) solenoid 412. The RTP solenoid 412 is preferably an electrically controlled on/off solenoid. The RTP solenoid 412 receives hydraulic fluid 102 from the solenoid supply line 216 and is operable to control the flow of hydraulic fluid 102 to the fluid line 410. Control port 400F is in communication with a fluid line 414 which is in communication with an out-of-Park (OOP) solenoid 416. The OOP solenoid 416 is preferably an electrically controlled on/off solenoid. The OOP solenoid 416 receives hydraulic fluid 102 from the solenoid supply line 216 and is operable to control the flow of hydraulic fluid 102 to the fluid line 414.

The ETRS valve assembly 400 further includes a valve 420 slidably disposed within a bore 422. The valve 420 is moveable between the Park position and the out-of-Park position by selective activation of the RTP solenoid 412 and the OOP solenoid 416. A biasing member 424 acts on an end of the valve 420 to bias the valve 420 to a de-stroked position which corresponds to the Park position. When the OOP solenoid 416 is energized, hydraulic fluid 102 communicated from the solenoid supply line 216 to the OOP solenoid 416 passes through the OOP solenoid 416 to the control port 400F and the hydraulic fluid 102 acts on an end of the valve 420 to move the valve 420 to the out-of-Park position against the bias of the biasing member 424. In the out-of-Park position, inlet port 400A communicates pressurized hydraulic fluid 102 to the outlet port 400B. The pressurized hydraulic fluid 102 then enters the park servo 404 via the park servo feed line 402 and inlet port 404A to move the piston 406 to an out-of-Park position. When the RTP solenoid 412 is energized, hydraulic fluid 102 communicated from the solenoid supply line 216 to the RTP solenoid 412 passes through the RTP solenoid 412 to the control port 400E and the hydraulic fluid 102 acts on an end of the valve 420 to move the valve 420 back to the Park position. In the Park position, the valve 420 prevents the inlet port 400A from communicating with the outlet port 400B. Accordingly, pressurized hydraulic fluid 102 within the park servo 404 exhausts back through the ETRS valve assembly 400 via the park servo feed line 402, back through the outlet port 400B, and out the exhaust port 400D. The piston 406 then translates back to the Park position.

During general operation of the hydraulic control system 100, the accumulator 130 provides the pressurized hydraulic fluid 102 throughout the system and the pump 106 is employed to charge the accumulator 130. Selection of a particular forward or reverse gear ratio is achieved by selectively actuating one of the torque transmitting devices 22, 24 and selectively actuating one of the synchronizer assemblies 30A-E. It should be appreciated that which actuator assembly 30A-E and which torque transmitting device 22, 24 provide which forward or reverse gear ratio may vary without departing from the scope of the present invention. To engage or actuate the first torque transmitting device 22, the first pressure control solenoid 138 and the first clutch control solenoid 142 are energized. To engage or actuate the second torque transmitting device 24, the second pressure control solenoid 140 and the second clutch control solenoid 146 are energized.

To actuate the first synchronizer assembly 30A, the first solenoid 214 is energized to move the first logic valve assembly 154 to the stroked position and the second solenoid 250 is de-energized to move the second logic valve assembly 156 to the de-stroked position. In addition, one of the first and second torque transmitting devices 22, 24 are engaged as described above. Bi-directional translation of the first synchronizer assembly 30A is then achieved by selectively energizing the synchronizer control solenoids 150, 152. For example, synchronizer control solenoid 150 is energized to move the first synchronizer actuating assembly 196A and therefore the first synchronizer assembly 30A to a first engaged position, synchronizer control solenoid 152 is energized to move the first synchronizer actuating assembly 196A and therefore the first synchronizer assembly 30A to a second engaged position, and both synchronizer control solenoids 150, 152 are engaged to provide a neutral position.

To actuate the second synchronizer assembly 30B, the first solenoid 214 is energized to move the first logic valve assembly 154 to the stroked position and the second solenoid 250 is energized to move the second logic valve assembly 156 to the stroked position. In addition, one of the first and second torque transmitting devices 22, 24 are engaged as described above. Bi-directional translation of the second synchronizer assembly 30B is then achieved by selectively energizing the synchronizer control solenoids 150, 152. For example, synchronizer control solenoid 150 is energized to move the second synchronizer actuating assembly 196B and therefore the second synchronizer assembly 30B to a first engaged position, synchronizer control solenoid 152 is energized to move the second synchronizer actuating assembly 196B and therefore the second synchronizer assembly 30B to a second engaged position, and both synchronizer control solenoids 150, 152 are engaged to provide a neutral position.

To actuate the third synchronizer assembly 30C, the first solenoid 214 is de-energized to move the first logic valve assembly 154 to the de-stroked position and the third solenoid 270 is de-energized to move the third logic valve assembly 158 to the de-stroked position. In addition, one of the first and second torque transmitting devices 22, 24 are engaged as described above. Bi-directional translation of the third synchronizer assembly 30C is then achieved by selectively energizing the synchronizer control solenoids 150, 152. For example, synchronizer control solenoid 150 is energized to move the third synchronizer actuating assembly 196C and therefore the third synchronizer assembly 30C to a first engaged position, synchronizer control solenoid 152 is energized to move the third synchronizer actuating assembly 196C and therefore the third synchronizer assembly 30C to a second engaged position, and both synchronizer control solenoids 150, 152 are engaged to provide a neutral position.

To actuate the fourth synchronizer assembly 30D, the first solenoid 214 is de-energized to move the first logic valve assembly 154 to the de-stroked position, the third solenoid 270 is energized to move the third logic valve assembly 158 to the stroked position, and the fourth solenoid 290 is energized to move the fourth logic valve assembly 160 to the stroked position. In addition, one of the first and second torque transmitting devices 22, 24 are engaged as described above. Bi-directional translation of the fourth synchronizer assembly 30D is then achieved by selectively energizing the synchronizer control solenoids 150, 152. For example, synchronizer control solenoid 150 is energized to move the fourth synchronizer actuating assembly 196D and therefore the fourth synchronizer assembly 30D to a first engaged position, synchronizer control solenoid 152 is energized to move the fourth synchronizer actuating assembly 196D and therefore the fourth synchronizer assembly 30D to a second engaged position, and both synchronizer control solenoids 150, 152 are engaged to provide a neutral position.

To actuate the fifth synchronizer assembly 30E, the first solenoid 214 is de-energized to move the first logic valve assembly 154 to the de-stroked position, the third solenoid 270 is energized to move the third logic valve assembly 158 to the stroked position, and the fourth solenoid 290 is de-energized to move the fourth logic valve assembly 160 to the de-stroked position. In addition, one of the first and second torque transmitting devices 22, 24 are engaged as described above. Bi-directional translation of the fifth synchronizer assembly 30E is then achieved by selectively energizing the synchronizer pressure control solenoids 150, 152. For example, synchronizer control solenoid 150 is energized to move the fifth synchronizer actuating assembly 196E and therefore the fifth synchronizer assembly 30E to a first engaged position, synchronizer control solenoid 152 is energized to move the fifth synchronizer actuating assembly 196E and therefore the fifth synchronizer assembly 30E to a second engaged position, and both synchronizer control solenoids 150, 152 are engaged to provide a neutral position.

During operation of the hydraulic control system 100, the RTP solenoid 412 prevents Park release while the OOP solenoid 416 protects against engaging Park while in drive or reverse if the RTP solenoid 412 fails in an open position. The RTP and OOP solenoids 412 and 416 are fed hydraulic fluid 102 using gearbox pressure (i.e. from the source of hydraulic fluid, the pump 106 and accumulator 130) in order to reduce system leakage. Park automatically engages via the park servo 404 when the hydraulic system 100 loses pressure or power. In this condition, to prevent engagement of Park until the motor vehicle has stopped, a park inhibit solenoid is used to prevent engagement of Park.

Figure 3A:
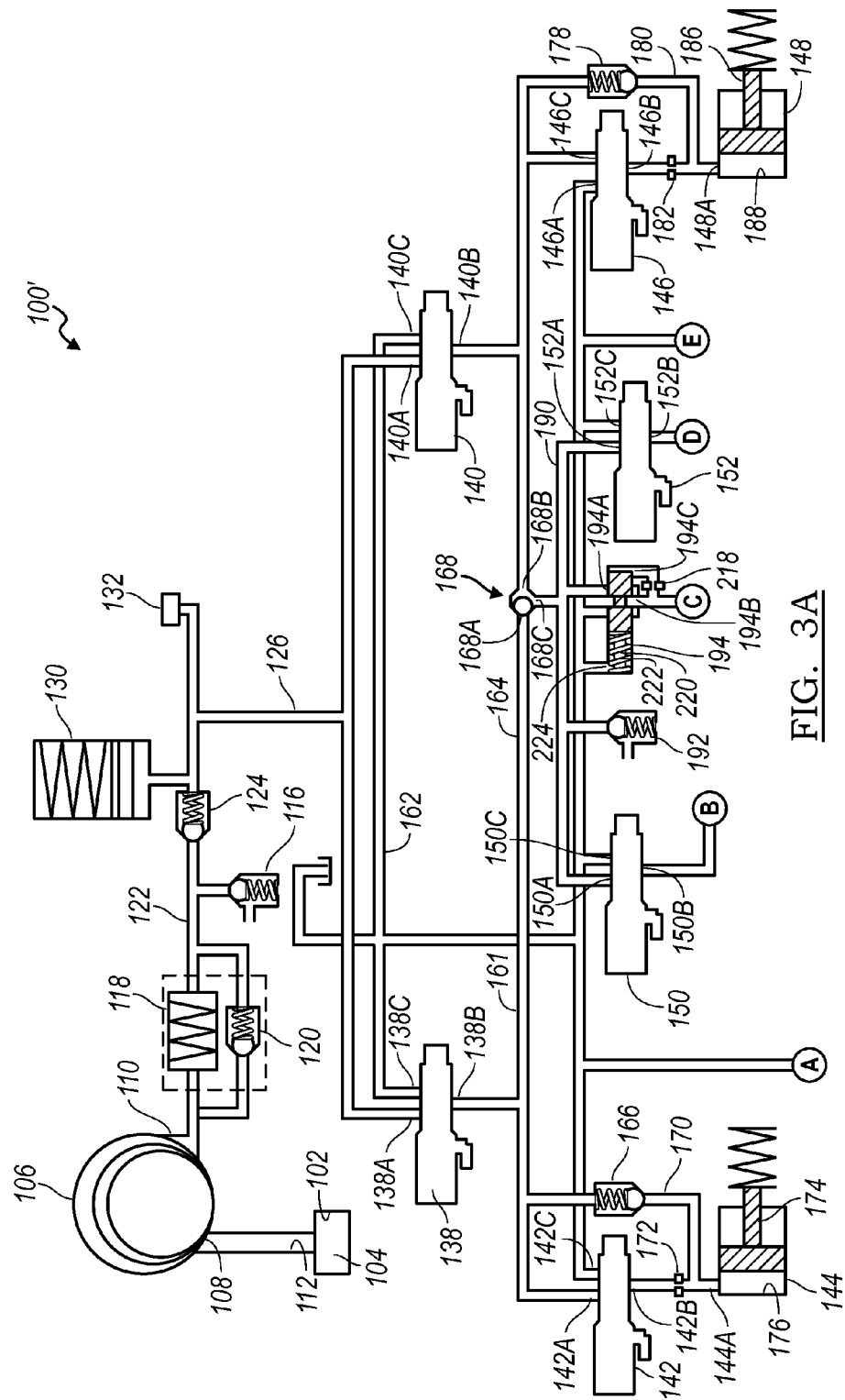
FIGS. 3A-C is a schematic diagram of another embodiment of a hydraulic control system for a dual clutch transmission according to the principles of the present invention.
Figure 3B:
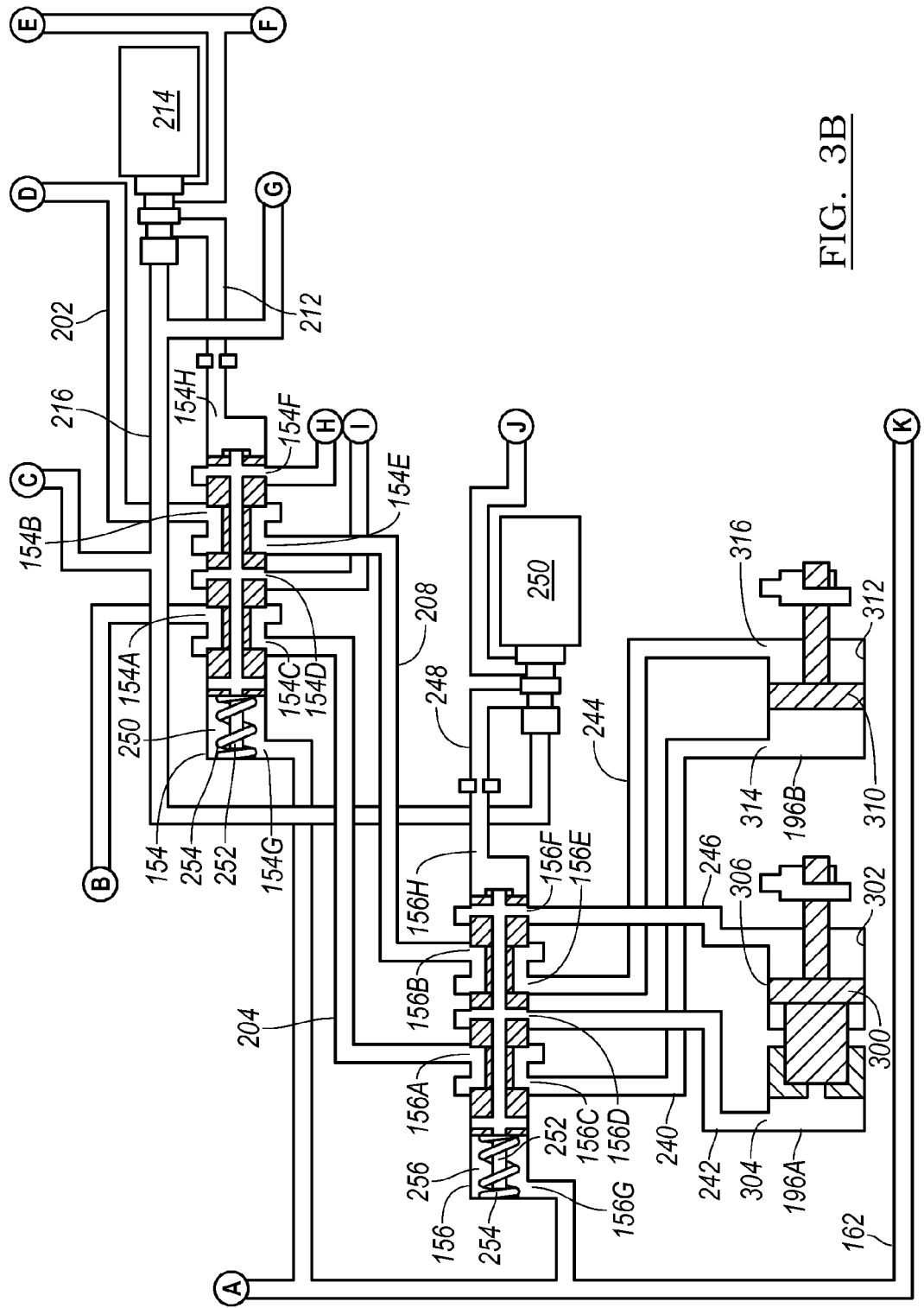
Figure 3C:
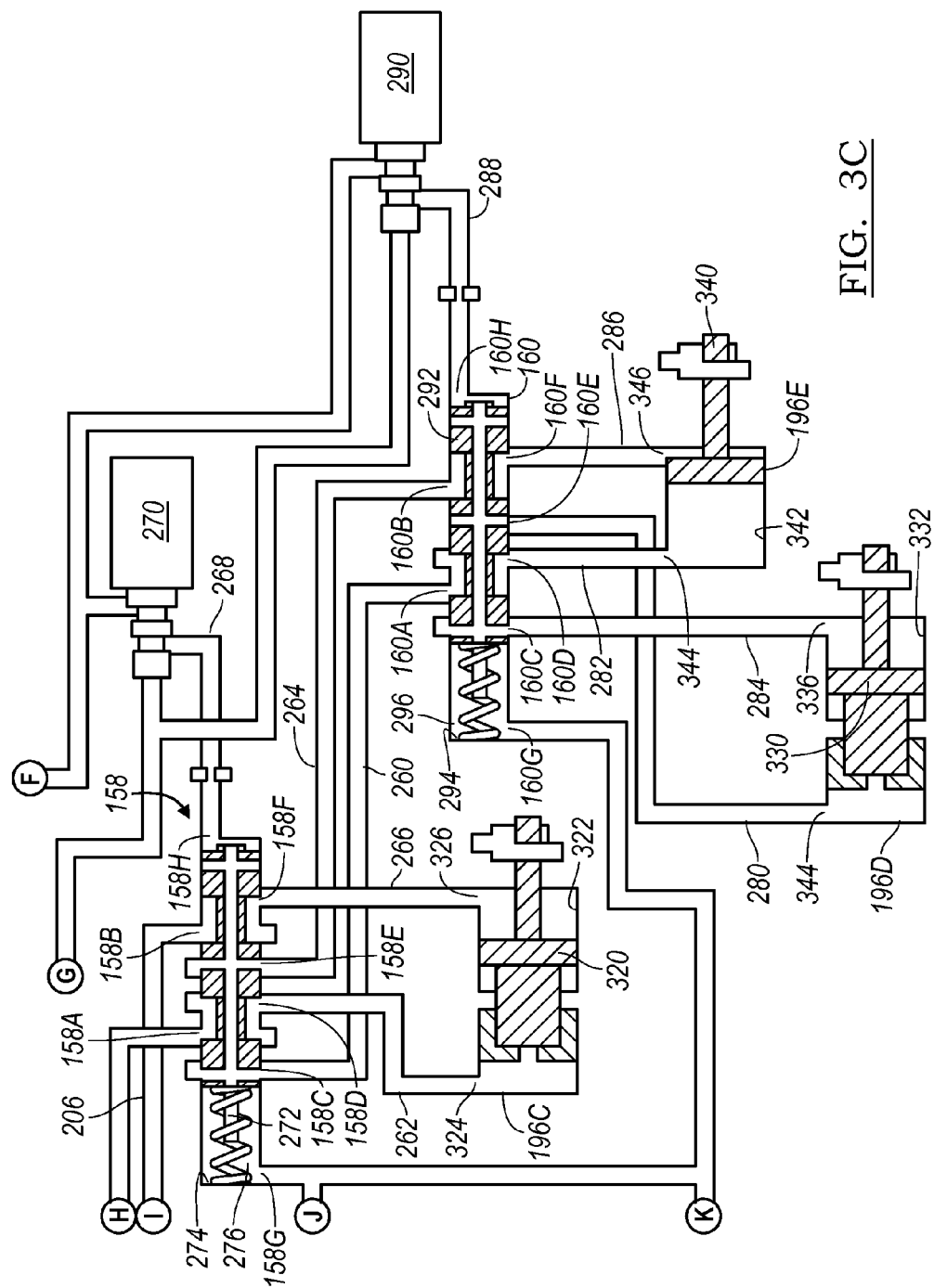

Turning to FIGS. 3A-C, another example of a hydraulic control system is indicated by reference number 100'. The hydraulic control system 100' is substantially similar to the hydraulic control system 100 and like parts are indicated by like reference numbers. However, the hydraulic control system 100' does not include the ETRS valve assembly 400 and servo mechanism 404 shown in FIGS. 2A-C. In addition, shift actuators 196A, 196C, and 196D are three area piston assemblies instead of two area piston assemblies, but it should be realized either may be used. Operation of the hydraulic control system 100' is similar to that of the previously described hydraulic control system 100.

The description of the invention is merely exemplary in nature and variations that do not depart from the general essence of the invention are intended to be within the scope of the invention. Such variations are not to be regarded as a departure from the spirit and scope of the invention.

We claim the following:

1. A hydraulic control system for controlling a dual clutch and a plurality of synchronizers in a transmission, the hydraulic control system comprising:
   a source of pressurized hydraulic fluid;
   a first pressure control solenoid having an input and an output, wherein the input is in fluid communication with the source of pressurized hydraulic fluid;
   a second pressure control solenoid having an input and an output, wherein the input is in fluid communication with the source of pressurized hydraulic fluid;
   a first clutch solenoid having an input and an output, wherein the input is in fluid communication with the output of the first pressure control solenoid;
   a second clutch solenoid having an input and an output, wherein the input is in fluid communication with the output of the second pressure control solenoid;
   a first clutch actuator in fluid communication with the first clutch solenoid for selectively actuating the dual clutch;
   a second clutch actuator in fluid communication with the second clutch solenoid for selectively actuating the dual clutch;
   a check valve assembly having a first input in fluid communication with the output of the first pressure control solenoid, a second input in fluid communication with the output of the second pressure control solenoid, and an output;
   a first synchronizer solenoid having an input and an output, wherein the input is in fluid communication with the output of the check valve assembly;
   a second synchronizer solenoid having an input and an output, wherein the input is in fluid communication with the output of the check valve assembly;
   a range selection valve having an input and an output, wherein the input is in fluid communication with the output of the check valve assembly;
   a park servo mechanism in communication with the output of the range selection valve, the park servo mechanism operable to place the transmission in a Park mode of operation and an out-of-Park mode of operation; and a plurality of logic valves for selectively communicating pressurized hydraulic fluid from the first and second synchronizer solenoids to a plurality of synchronizer actuators in order to actuate the plurality of synchronizers.

2. The hydraulic control system of claim 1 further comprising:
a first logic valve having a first input in fluid communication with the output of the first synchronizer solenoid, a second input in fluid communication with the output of the second synchronizer solenoid, a first output, a second output, a third output, and a fourth output;
a second logic valve having a first input in fluid communication with the first output of the first logic valve, a second input in fluid communication with the third output of the first logic valve, a first output, a second output, a third output, and a fourth output;
a third logic valve having a first input in fluid communication with the fourth output of the first logic valve, a second input in fluid communication with the second output of the first logic valve, a first output, a second output, a third output, and a fourth output;
a fourth logic valve having a first input in fluid communication with the first output of the third logic valve, a second input in fluid communication with the third output of the third logic valve, a first output, a second output, a third output, and a fourth output;
a first synchronizer actuator having a first port in fluid communication with the second output of the second logic valve and a second port in fluid communication with the fourth output of the second logic valve;
a second synchronizer actuator having a first port in fluid communication with the first output of the second logic valve and a second port in fluid communication with the third output of the second logic valve;
a third synchronizer actuator having a first port in fluid communication with the second output of the third logic valve and a second port in fluid communication with the fourth output of the third logic valve;
a fourth synchronizer actuator having a first port in fluid communication with the third output of the fourth logic valve and a second port in fluid communication with the first output of the fourth logic valve; and
a fifth synchronizer actuator having a first port in fluid communication with the second output of the fourth logic valve and a second port in fluid communication with the fourth output of the fourth logic valve.

3. The hydraulic control system of claim 2 wherein the first inputs of the first, second, third, and fourth logic valves are in selective communication with the first and second outputs of the first, second, third, and fourth logic valves, and wherein the second inputs of the first, second, third, and fourth logic valves are in selective communication with the third and fourth outputs of the first, second, third, and fourth logic valves.

4. The hydraulic control system of claim 2 further comprising a feed limit valve disposed between the output of the check valve assembly and the range selection valve, the feed limit valve having an input in communication with the output of the check valve assembly and an output in communication with the input of the range selection valve, the feed limit valve operable to regulate the pressure of hydraulic fluid communicated through the feed limit valve.

5. The hydraulic control system of claim 4 further comprising a out-of-Park (OOP) solenoid and a return-to-Park (RTP) solenoid, wherein the OOP solenoid includes an input in fluid communication with the output of the feed limit valve and an output in fluid communication with a first end of the range selection valve, and wherein the RTP solenoid includes an input in fluid communication with the output of the feed limit valve and an output in fluid communication with a second end of the range selection valve disposed opposite the first end.

6. The hydraulic control system of claim 4 further comprising first, second, third, and fourth solenoids, wherein each of the first, second, third, and fourth solenoids include an input in fluid communication with the output of the feed limit valve, and wherein the first solenoid includes an output in fluid communication with an end of the first logic valve, the second solenoid includes an output in fluid communication with an end of the second logic valve, the third solenoid includes an output in fluid communication with an end of the third logic valve, and the fourth solenoid includes an output in fluid communication with an end of the fourth logic valve.

7. The hydraulic control system of claim 6 wherein the first, second, third, and fourth solenoids are on/off solenoids.

8. The hydraulic control system of claim 1 further comprising a blow off valve in fluid communication with the output of the check valve assembly, the blow off valve operable to open if the pressure of the hydraulic fluid communicated from the output of the check valve exceeds a predetermined threshold.

9. The hydraulic control system of claim 1 wherein the source of pressurized hydraulic fluid includes a pump and an accumulator.

10. The hydraulic control system of claim 1 wherein the first and second clutch control solenoids are variable flow solenoids.

11. A hydraulic control system for controlling a dual clutch and a plurality of synchronizers in a transmission, the hydraulic control system comprising:
a source of pressurized hydraulic fluid;
a first pressure control solenoid having an input and an output, wherein the input is in fluid communication with the source of pressurized hydraulic fluid;
a second pressure control solenoid having an input and an output, wherein the input is in fluid communication with the source of pressurized hydraulic fluid;
a first clutch solenoid having an input and an output, wherein the input is in fluid communication with the output of the first pressure control solenoid;
a second clutch solenoid having an input and an output, wherein the input is in fluid communication with the output of the second pressure control solenoid;
a first clutch actuator in fluid communication with the first clutch solenoid for selectively actuating the dual clutch;
a second clutch actuator in fluid communication with the second clutch solenoid for selectively actuating the dual clutch;
a check valve assembly having a first input in fluid communication with the output of the first pressure control solenoid, a second input in fluid communication with the output of the second pressure control solenoid, and an output;
a first synchronizer solenoid having an input and an output, wherein the input is in fluid communication with the output of the check valve assembly;
a second synchronizer solenoid having an input and an output, wherein the input is in fluid communication with the output of the check valve assembly;
a first logic valve having a first input in fluid communication with the output of the first synchronizer solenoid, a second input in fluid communication with the output of the second synchronizer solenoid, a first output, a second output, a third output, and a fourth output;

a second logic valve having a first input in fluid communication with the first output of the first logic valve, a second input in fluid communication with the third output of the first logic valve, a first output, a second output, a third output, and a fourth output;

a third logic valve having a first input in fluid communication with the fourth output of the first logic valve, a second input in fluid communication with the second output of the first logic valve, a first output, a second output, a third output, and a fourth output;

a fourth logic valve having a first input in fluid communication with the first output of the third logic valve, a second input in fluid communication with the third output of the third logic valve, a first output, a second output, a third output, and a fourth output;

a first synchronizer actuator having a first port in fluid communication with the second output of the second logic valve and a second port in fluid communication with the fourth output of the second logic valve;

a second synchronizer actuator having a first port in fluid communication with the first output of the second logic valve and a second port in fluid communication with the third output of the second logic valve;

a third synchronizer actuator having a first port in fluid communication with the second output of the third logic valve and a second port in fluid communication with the fourth output of the third logic valve;

a fourth synchronizer actuator having a first port in fluid communication with the third output of the fourth logic valve and a second port in fluid communication with the first output of the fourth logic valve; and a fifth synchronizer actuator having a first port in fluid communication with the second output of the fourth logic valve and a second port in fluid communication with the fourth output of the fourth logic valve.

12. The hydraulic control system of claim 11 wherein the first inputs of the first, second, third, and fourth logic valves are in selective communication with the first and second outputs of the first, second, third, and fourth logic valves, and wherein the second inputs of the first, second, third, and fourth logic valves are in selective communication with the third and fourth outputs of the first, second, third, and fourth logic valves.

13. The hydraulic control system of claim 11 further comprising:

a range selection valve having an input and an output, wherein the input is in fluid communication with the output of the check valve assembly; and a park servo mechanism in communication with the output of the range selection valve, the park servo mechanism operable to place the transmission in a Park mode of operation and an out-of-Park mode of operation.

14. The hydraulic control system of claim 13 further comprising a feed limit valve disposed between the output of the check valve assembly and the range selection valve, the feed limit valve having an input in communication with the output of the check valve assembly and an output in communication with the input of the range selection valve, the feed limit valve operable to regulate the pressure of hydraulic fluid communicated through the feed limit valve.

15. The hydraulic control system of claim 14 further comprising an out-of-Park (OOP) solenoid and a return-to-Park (RTP) solenoid, wherein the OOP solenoid includes an input in fluid communication with the output of the feed limit valve and an output in fluid communication with a first end of the range selection valve, and wherein the RTP solenoid includes an input in fluid communication with the output of the feed limit valve and an output in fluid communication with a second end of the range selection valve disposed opposite the first end.

16. The hydraulic control system of claim 14 further comprising first, second, third, and fourth solenoids, wherein each of the first, second, third, and fourth solenoids include an input in fluid communication with the output of the feed limit valve, and wherein the first solenoid includes an output in fluid communication with an end of the first logic valve, the second solenoid includes an output in fluid communication with an end of the second logic valve, the third solenoid includes an output in fluid communication with an end of the third logic valve, and the fourth solenoid includes an output in fluid communication with an end of the fourth logic valve.

17. The hydraulic control system of claim 16 wherein the first, second, third, and fourth solenoids are on/off solenoids.

18. The hydraulic control system of claim 11 further comprising a blow off valve in fluid communication with the output of the check valve assembly, the blow off valve operable to open if the pressure of the hydraulic fluid communicated from the output of the check valve exceeds a predetermined threshold.

19. The hydraulic control system of claim 11 wherein the source of pressurized hydraulic fluid includes a pump and an accumulator.

20. The hydraulic control system of claim 11 wherein the first and second clutch control solenoids are variable flow solenoids.

* * * * *